United States Patent Office 3,250,758
Patented May 10, 1966

3,250,758
PROCESS FOR THE MANUFACTURE OF
N-ACYL-PEPTIDES
Friedrich Weygand, Pullach, Isartal, and Wolfgang Steglich, Axel Prox, and Joachim Kaelicke, Munich, Germany, assignors to Farbwerke Hoechst Aktiengesellschaft vormals Meister Lucius & Bruning, Frankfurt am Main, Germany, a corporation of Germany
No Drawing. Filed May 10, 1960, Ser. No. 27,990
Claims priority, application Germany, May 15, 1959,
F 28,443
7 Claims. (Cl. 260—112.5)

Processes for the manufacture of peptides, by which are prepared peptides that contain a free carboxylic group and that are protected at the amino group by acyl radicals e.g. the carbobenzoxy radical, the trifluoracetyl radical, the phthalyl radical, are advantageous inasmuch as they allow of easily extending the acyl peptides at the carboxyl terminals by further amino acid groups. In addition, for obtaining the free peptides it is only necessary to remove the radical protecting the amino groups, so that the difficulties which are sometimes encountered when esterhydrolyzing can be by-passed thereby.

The so-called activated esters (cf. Fortschritte der Chemie org. Naturstoffe, volume 13, pages 495–498) of N-acylamino acids or N-acyl-peptides do not decompose during storage as is the case with the acyl-amino acidazides or the N-acyl-peptide-azides, the acid chlorides or the mixed anhydrides; they are, therefore, of particular interest for the synthesis of N-acyl-peptides. Two drawbacks, however, have up to now prevented the application of these esters. Firstly, the reaction must be carried out in most cases in an aqueous-alkaline medium; hence it is accompanied with salt formation so that the unreacted portion of the precious amino acids can be recovered only difficultly. Moreover, if radicals are used as amino protecting groups which can be easily separated, for example, the trifluoracetyl radical, these radicals are partly separated so that no uniform products are obtained. Secondly, if strongly activated esters, for example, p-nitrophenyl esters, are used, there take place racemizations. In consequence of these drawbacks, the processes for the manufacture of acyl-peptides that contain a free carboxylic group with the use of activated esters of N-acylamino acids did not gain importance in practice.

Now, we have found that it is possible to condense activated acyl-amino acid esters with amino acids or peptides in weak aliphatic carboxylic acids of low molecular weight to prepare N-acyl-peptides of the formula $$R—X—CO—(X—CO)_nOH$$

wherein $n$ is an integer from 1 to 5, R represents a member selected from the group consisting of trifluoracetyl, carbobenzoxy and phthalyl, X stands for a member selected from the group consisting of

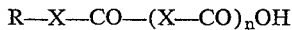
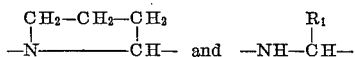

wherein $R_1$ stands for a member selected from the group consisting of hydrogen, methyl, isopropyl, isobutyl, α-hydroxyethyl, O-benzoxymethyl, delta-amino-butyl, γ-guanidyl-propyl, γ-nitroguanidyl-propyl, S-methyl-mercaptoethyl, S-benzyl-mercaptomethyl, carbomethoxy-methyl, indolyl-methyl, benzyl and 4-hydroxybenzyl. The process comprises reacting an ester of the formula

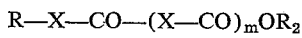

wherein R and X have the meanings given above, $R_2$ represents a member selected from the group consisting of phenyl, thiophenyl, p-nitrophenyl, p-nitrothiophenyl and cyanomethyl, and $m$ is an integer from 0 to 2, with an acid of the formula

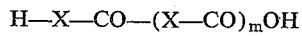

wherein X and $m$ have the meanings given above, in a carboxylic acid selected from the group consisting of acetic acid, propionic acid and methoxy acetic acid. By carrying out the condensation in the specified media the drawbacks mentioned before are avoided because the operation is effected in the absence of mineral salts.

Radicals that are sensitive to alkali, for example, the trifluoracetyl radical, are not split off and at not too high temperatures racemizations do not occur or to a low degree only. An exception is only the racemization which takes place when condensing activated N-acylamino acid esters with O-benzyl-L-serine and S-benzyl-cysteine.

As weak aliphatic carboxylic acids of low molecular weight, there enter into consideration such as contain 2 to about 4 carbon atoms, the compounds that are liquid at room temperature and that pass over at temperatures below 100° C. under reduced pressure being preferred. When carboxylic acids are used which are solid at room temperature, the reaction must be performed at temperatures at which these acids are melted (liquid). By way of example, there are mentioned: low aliphatic unsubstituted monocarboxylic acids such as acetic acid, propionic acid, and substituted aliphatic carboxylic acids of this kind, such as methoxyacetic acid.

As activated esters, there may be used, for example, the esters of phenol, thiophenol, p-nitrothiophenol, p-nitrophenol, cyanomethyl-alcohol. In the last case it must be noted that cyanomethyl alcohol is formed during the reaction, which decomposes under formation of hydrocyanic acid and formaldehyde, so that the use of this ester of this alcohol is less advised in view of the physiological effects of the decomposition product and because of a possible reaction of the formaldehyde with the amino acids.

As second component there may be used an amino acid or a peptide. Should the amino acid or the peptide not dissolve completely at once, even not upon heating, this is without importance for the reaction. The reaction proceeds slowly and the amino acids or peptides pass into solution at the rate at which the reaction proceeds.

When amino acids are used that contain several amino groups in the molecule, for example, lysine or arginine, one succeeds, when using the amino acids in the form of their hydrohalides, for example, as hydrochloride or hydrobromide, to achieve reaction at only one nitrogen atom. To realize a better yield, however, it is more suitable to protect all the amino groups except one.

Although the reaction may be conducted at room temperature, it is preferred to operate at higher temperatures in order to shorten the reaction time. It is preferred to apply temperatures above about 50° C. and to conduct the reaction in general at temperatures in the range of 100 and 120° C. In case more sensitive components are used, it may, however, be of advantage to limit the reaction temperature to about 50 and about 100° C.

The heating period is determined by the components to be used and depends on the nature of the activated ester, i.e. whether it is strongly or weakly activated, as well as on the constitution of the components. It is the longer, the stronger the steric hinderance is. The optimum reaction time, however, can be easily determined by a preliminary test. In general, it ranges between one half hour and several hours. Thus, when heating for four hours 1.95 g. of carbobenzoxy-L-leucine-thiophenyl ester and 0.5 g. of glycine in 3 cc. of glacial acetic acid, there is obtained 1.37 g. (77.5%) of carbobenzoxy-L-leucyl-glycine. On the other hand, the reaction of the sterically unhindered carbobenzoxy-glycine-thiophenyl ester with the L-phenyl-alanine gives, upon heating for ½ hour in glacial acetic acid, a yield of more than 73% of recrystallized carbobenzoxy-glycyl-L-phenylalanine. In the case of amino groups that are sterically strongly hindered, it is advisable to operate with as small solvent quantities as possible and to add the amino acid portionwise in the course of several hours.

A particular advantage of the new process is the simplicity of the working-up procedure. The reaction product as well as the components that are unreacted or that have been applied in excess, can be easily isolated. A component will be applied in excess in those cases in which the other component is a particularly valuable product which shall be reacted completely. The solvent, preferably glacial acetic acid, is generally evaporated after termination of the reaction. By adding acetic ester the free amino acid or the free peptide that has not reacted or that has been applied in excess precipitates and can be shaken out with water. The N-acyl-peptide may then be extracted from the acetic ester by means of an aqueous bicarbonate solution, from which it is liberated again by acidification. The unreacted or the excess of active ester remains in the acetic-ester and can be separated therefrom in crystalline form by evaporation and addition of petroleum ether. The working up depends of course on the properties of the components applied and must be varied accordingly.

The new process allows of preparing in a short time and in most simple manner many peptides. The splitting off of the acylradicals in order to obtain the free peptides is carried out in known manner. Only with the free cysteine these reactions do not succeed because this compound is extremely difficultly soluble in the acids that come into consideration. Since nitroarginine and threonine are likewise only very difficultly soluble in the unsubstituted carboxylic acids mentioned before, it is advised to use methoxyacetic acids.

Amino-acids of the type of the asparagine and glutamine, i.e. compounds that contain a carbamide group, cannot be reacted according to the process of the present invention with activated N-acylamino acid esters. The semi-esters of the glutamic acid and aspartic acid, however, are suitable as starting substances for the present peptide synthesis. The reaction, on the other hand, does not succeed with histidine.

It should be noted that beside the peptide synthesis there is taking place an acetylation of the free amino acid or the peptide in hot glacial acetic acid. This acetylation, however, is almost of no importance in the case of amino acids or peptides that are sterically hindered. Its importance can be still more reduced by using a multiple excess quantity of the activated ester component. It has already been mentioned that such an excess can be recovered easily.

The maximum yields of acyl-peptides can be calculated from the measurement of the reaction rate of the peptide formation and the acetylation in glacial acetic acid; these calculated values are in good accordance with the values found in experiments.

CHANGES OF THE MAXIMUM YIELDS AT VARIOUS RATIOS OF CARBOBENZOXY-AMINO ACID-THIOPHENYL ESTER TO AMINO-ACID

| Carbobenzoxy-L-leucyl-thiophenyl ester: L-Leucine | Maximum yields of carbobenzoxy-L-leucyl-L-leucine, percent of the theory |
|---|---|
| Molar ratio: | |
| 1:1 | 44 |
| 2:1 | 64 |
| 3:1 | 74 |
| 4:1 | 79 |

| Carbobenzoxy-L-leucyl-thiophenyl ester: glycine | Maximum yields of carbobenzoxy-L-leucyl-glycine, percent of the theory |
|---|---|
| Molar ratio: | |
| 1:1 | 70 |
| 2:1 | 86 |
| 3:1 | 91 |
| 4:1 | 93 |

In order to further stress the advantages of the process of the present invention, it should be noted that, for example, the carbobenzoxy-glycyl-L-alanyl-L-phenylalanyl-glycine has been prepared, for the first time absolutely free from racemized portions, by Kenner et al. (J. Chem. Soc., London, 1957, page 1406) by countercurrent dispersion, whereas the same product is obtained in simple manner by the process of the present invention in an optically pure form.

The following examples illustrate the invention but they are not intended to limit it thereto:

*Example 1*

1.95 grams of carbobenzoxy-L-leucine-thiophenyl ester and 0.5 g. of glycine are heated under reflux in 3 cc. of glacial acetic acid for four hours, during which time the glycine passes slowly into solution. The acetic acid is then distilled off in the vacuum. The product is taken up in acetic ester, the whole is shaken out with a saturated sodium bicarbonate solution, and the bicarbonate solution is acidified to pH by means of concentrated hydrochloric acid. The carbobenzoxy-L-leucyl-glycine thereby precipitates and crystallizes. It is then filtered with suction, dried and recrystallized from acetic ester added with petroleum ether. It can, however, be taken up again in acetic ester, the acetic ester solution is dried with sodium sulfate, the acetic ester is then evaporated almost completely and the product caused to crystallize by adding petroleum ether.

After recrystallization the product is obtained in a yield of 1.37 g. (77.5% of the theory); it melts at 112–113° C., $[\alpha]_D^{25.5}$: −23.7° (c.=2.87 in absolute ethanol). A small quantity of product can be recovered from the mother liquor.

*Example 2*

3.01 grams of carbobenzoxy-glycine-thiophenyl ester and 1.65 grams of L-phenylalanine (specific rotation: −31.9°) are heated under reflux for 30 minutes in 3 cc. of glacial acetic acid. By working up in the manner described in Example 1 there are obtained 2.61 grams of carbobenzoxy-glycyl-L-phenylalanine (73% of the theory) having a melting point of 120–122° C. In addition, there is obtained a small quantity of racemate which is somewhat more difficultly soluble in acetic ester, since the L-phenylalanine used has a specific rotation of only −31.9° instead of −35°.

*Example 3*

0.70 gram of N-trifluoracetyl-L-phenylalanine-thiophenyl ester and 0.165 gram of glycine are heated under reflux for two hours in 2 cc. of glacial acetic acid. By working up in the manner described in Example 1, there are obtained 0.42 gram of N-trifluoracetyl-L-phenylalanyl-glycine (66% of the theory) which melts, after single recrystallization, at 155–157° C.

The free dipeptide-L-phenylalanyl-glycine, obtained by treatment with aqueous ammonia, evaporation to dryness and digestion with hot absolute alcohol, shows the rotation $[\alpha]_D^{23}$: +74.1° (c.=1.9 in water).

Example 4

0.920 gram of carbobenzoxy-glycine-thiophenyl ester and 0.351 gram of DL-valine in 2 cc. of glacial acetic acid are heated in an oil bath (bath temperature 130° C.) for about 60 minutes. The glacial acetic acid is then removed by distillation in the vacuum, the residue is shaken with acetic ester and a saturated sodium bicarbonate solution. 0.031 gram of carbobenzoxy-glycine-thiophenyl ester are received from the acetic ester phase. Upon acidification to pH 1, the aqueous phase yields 0.830 gram of carbobenzoxy-glycyl-DL-valine (95% of the theory) having a melting point of 125–126° C. After renewed heating the compound solidifies and melts then at 143–144° C.

Example 5

0.920 gram of carbobenzoxy-glycine-thiophenyl ester and 0.351 gram of DL-valine are heated for 40 minutes in 2 cc. of propionic acid in an oil bath (bath temperature 130° C.). By working up in the manner described in Example 4, there is obtained 0.828 g. of carbobenzoxy-glycyl-DL-valine (94% of the theory).

Example 6

1.89 grams of carbobenzoxy-L-alanine-thiophenyl ester (6 millimoles) and 0.702 gram of L-valine (3 millimoles) in 10 cc. of glacial acetic acid are heated for 3 hours under reflux in an oil bath. The glacial acetic acid is then distilled off in the vacuum. The residue is shaken with acetic ester and a saturated sodium bicarbonate solution. The carbobenzoxy-glycine-thiophenyl ester used in excess is recovered in crystalline form from the acetic ester phase by evaporation of the solvent and by addition of petroleum ether. After acidification with hydrochloric acid to pH 1, the sodium bicarbonate solution yields 1.12 gram (58% of the theory) of carbobenzoxy-L-alanyl-L-valine melting at 126–129° C. After recrystallization from ethanol-water, the compound melts at 146–148° C.

When 3 millimoles each of both components are used and heated for 3 hours in 2 cc. of glacial acetic acid on the oil bath (bath temperature 130° C.) the yield of carbobenzoxy-L-alanyl-L-valine is 0.67 g. (69% of the theory).

Example 7

0.904 gram of carbobenzoxy-glycine-thiophenyl ester and 0.538 gram of L-alanine in 5 cc. of glacial acetic acid are heated in a boiling water bath. The glacial acetic acid is then distilled off in vacuo and the residue is digested with acetic ester, whereby the unreacted alanine is precipitated. The carbobenzoxy-glycyl-L-alanine is shaken out with a saturated sodium hydrogen carbonate solution and liberated by acidification with hydrochloric acid. The product is obtained in a yield of 0.61 gram (73% of the theory) and has after recrystallization from acetic ester a melting point of 131–145° C., and $[\alpha]_D^{26}$: −9.45° (c.=2.96 in alcohol).

Example 8

1.8 grams of carbobenzoxy-glycine-thiophenyl ester and 0.54 gram of glycine in 4 cc. of glacial acetid acid are heated on the oil bath for ½ hour to 130° C. By working up in a manner analogous to that described in the foregoing examples, there is obtained 1.45 g. of carbobenzoxy-glycyl-glycine (91% of the theory) having a melting point of 175–176° C.

Example 9

1.0 gram of carbobenzoxy-glycine-thiophenyl ester and 0.265 gram of glycyl-L-leucine in 5 cc. of glacial acetic acid are heated for 1½ hours in an oil bath (bath temperature 130° C.). By working up in a manner analogous to that described in the foregoing examples, there is obtained 0.417 gram of carbobenzoxy-glycyl-glycyl-L-leucine (78% of the theory) having a melting point of 135–137° C.; after recrystallization from water the product melts at 146–148° C. $[\alpha]_D^{24}$: +1.6° (c.=2.16 in absolute ethanol). After separation of the carbobenzoxy residue the diglycyl-L-leucine thus formed shows the correct optical rotation of $[\alpha]_D^{20}$: −28.1° (c.=2.53 in water).

Example 10

1.8 grams of carbobenzoxy-glycine-thiophenyl ester and 0.39 gram of L-leucine in 5 cc. of glacial acetic acid are heated under reflux for one hour. By working up in the manner described in the foregoing examples there are recovered 0.65 gram of crystalline carbobenzoxy-glycine-thiophenyl ester and 0.6 gram of carbobenzoxy-glycyl-L-leucine (62% of the theory) having a melting point of 137–138° C., $[\alpha]_D^{28}$: −17.7° (c=2.38 in N-sodium hydroxide solution).

About 10% of a less pure product are recovered from the mother liquors.

Example 11

1.39 gram of N-trifluoracetyl-L-alanine-thiophenyl ester and 0.375 g. of glycine in 5 cc. of glacial acetic acid are heated in an oil bath of 130° C. for about 1 hour. By working up in the manner described above, there are obtained 0.939 gram of oily N-trifluoracetyl-L-alanyl-glycine (77% of the theory).

This product yields, after de-trifluoracetylation in known manner with aqueous ammonia, L-alanyl-glycine having an optical rotation of $[\alpha]_D^{23}$: +49.3° (c.=2.86 in water).

Example 12

1.39 gram of N-trifluoracetyl-L-alanine-thiophenyl ester and 0.446 gram of L-alanine are heated in 10 cc. of glacial acetic acid for 2 hours in an oil bath (bath temperature 125° C.). By working up in the manner described above, there is obtained 0.80 gram of slowly crystallizing N-trifluoracetyl-L-alanyl-L-alanine (62.5% of the theory).

After recrystallization from ether/petroleum ether the compound melts at 149–151° C.

$[\alpha]_D^{28}$: −14.3°, $[\alpha]_{546}$: −19.2° (c.=2.03 in abs. tetrahydrofurane); 0.473 g. of N-trifluoracetyl-L-alanine-thiophenyl ester is recovered.

Example 13

3.01 grams of carbobenzoxy-glycine-thiophenyl ester and 1.15 grams of L-proline are heated for 90 minutes in 15 cc. of glacial acetic acid on the oil bath (bath temperature 130° C.). By working up in the manner described in Example 1, there are obtained 1.60 grams (55% of the theory) of carbobenzoxy-glycyl-L-proline, which, recrystallized from acetic ester/petroleum ether, melts at 150–151°. $[\alpha]_D^{23}$: −60.4° (c.=2.5 in absolute ethanol).

0.59 gram of carbobenzoxy-glycine-thiophenyl ester is recovered.

Example 14

3.01 grams of carbobenzoxy-glycine-thiophenyl ester and 1.49 grams of L-methionine in 15 cc. of glacial acetic acid are heated on the oil bath (bath temperature 130° C.) for 2 hours. After having evaporated the glacial acetic acid under reduced pressure, taken up in acetic ester and after having extracted the carbobenzoxy-glycine-L-methionine with aqueous sodium bicarbonate solution, the peptide crystallizes upon acidification with hydrochloric acid and melts after recrystallization from acetic ester/petroleum ether at 110–111° C. The yield is 78% of the theory.

$[\alpha]_D^{27}$: +4.2° (c.=2.40 in abs. ethanol).

Example 15

3.01 grams of carbobenzoxy-glycine-thiophenyl ester and 0.975 gram of O-benzyl-L-serine or the equal quantity of DL-compound in 20 cc. of glacial acetic acid are heated for 90 minutes on the oil bath (bath temperature 130° C.). By working up in a manner analogous to that of Example 1, there is obtained, after recrystallization from acetic ester, 0.94 gram of carbobenzoxy-glycine-DL-O-benzylserine (50% of the theory) having a melting point of 137–137.5° C.

Example 16

18.9 grams of carbobenzoxy-L-alanine-thiophenyl ester and 4.5 grams of glycine are heated in 100 cc. of glacial acetic acid for 2 hours on the oil bath (bath temperature 130° C.) Working up is carried out in usual manner. Upon addition of hot petroleum ether to the concentrated acetic ester extract, 13.3 grams (82% of the theory) of carbobenzoxy-L-alanyl-glycine having a melting point of 127–128° C. crystallize out.

$[\alpha]_D^{25}$: −17.0° (c.=2.65 in abs. ethanol).

Example 17

1.65 grams of carbobenzoxy-glycine-p-nitrothiophenyl ester and 1.02 grams of L-tryptophane are heated for about 2 hours in 5 cc. of glacial acetic acid on a boiling water bath. The glacial acetic acid is evaporated in usual manner in the vacuum, the residue is taken up in acetic ester and extracted with an aqueous sodium bicarbonate solution. The aqueous phase is first neutralized with concentrated hydrochloric acid and then adjusted to a pH of 3–4 by means of glacial acetic acid. Upon inoculation, 1.1 grams of carbobenzoxy-glycol-5-tryptophane (56% of the theory) having a melting point of 129–131° C. crystallize out. After repeated recrystallization from ethanol-water, the compound melts at 141–142° C.

$[\alpha]_D^{24}$: +33.3° (c.=2.34 in absolute ethanol).

Example 18

4.01 grams of carbobenzoxy-L-aspartic acid-β-methyl-α-p-nitrophenyl-ester and 0.75 gram of glycine are heated in 25 cc. of glacial acetic acid for 2 hours on the oil bath to 130° C. By working up as usual there are obtained 1.81 grams of carbobenzoxy-L-asparagyl-α-glycine-β-methyl ester (54% of the theory) which, after recrystallization from acetic ester/petroleum ether, melts at 122° C.

Example 19

16 grams of carbobenzoxy-glycine-thiophenyl ester and 7.0 grams of glycyl-glycine are heated for 1½ hours in 100 cc. of glacial acetic acid on the oil bath (bath temperature 130° C.). By working up in the usual manner, the carbobenzoxy-diglycyl-glycine crystallizes out. It is well washed with water. The yield of carbobenzoxy-diglycyl-glycine of a melting point of 184–186° C. (decomposition) amounts to 13.0 grams (76% of the theory).

Example 20

2.34 grams of carbobenzoxy-glycol-L-leucine-thiophenyl ester and 0.85 gram of glycine are heated for 2 hours in 10 cc. of glacial acetic acid on the oil bath (bath temperature 130° C.). By working up in the usual way, there is obtained 1.46 gram of carbobenzoxy-glycol-L-leucyl-glycine (68% of the theory) which does not crystallize. By de-carbobenzoxylating the product by heating with anhydrous trifluoracetic acid, there is formed the known glycyl-L-leucyl-glycine having $[\alpha]_D^{23}$: −43.8° (c.=2.67 in water).

Example 21

1.43 grams of carbobenzoxy-L-leucine-thiophenyl ester and 0.36 gram of L-alanine are heated for 11½ hours in 3 cc. of glacial acetic acid on the oil bath (bath temperature 130° C.).

After working up, the crude product is recrystallized from acetic ester/petroleum ether, and there is obtained 0.58 gram of carbobenzoxy-L-leucyl-L-alanine (43% of the theory) having a melting point of 150° C. $[\alpha]_D^{28}$ −24.6°.

Example 22

8.58 grams of carbobenzoxy-L-alanyl-glycine-thiophenyl ester and 3.0 grams of glycine are heated for 2 hours in 40 cc. of glacial acetic acid on the oil bath (bath temperature 130° C.). By working up in usual manner and recrystallizing from water, there are obtained 6.58 grams of carbobenzoxy-L-alanyl-glycyl-glycine (84% of the theory) melting at 161–1.63° C.

$[\alpha]_D^{25}$: −6.1°.

The same tripeptide is obtained by heating for 1½ hours and on the oil bath (bath temperature 130°) 9.34 grams of carbobenzoxy-L-alanine-thiophenyl ester and 3.93 grams of glycyl-glycine in 50 cc. of glacial acetic acid. By working up in the usual manner there are obtained 5.08 grams of carbobenzoxy-L-alanyl-glycyl-glycine (50% of the theory) melting at 155–157° C.; after recrystallization from water, it has likewise a melting point of 161–163° C.

Example 23

1.42 gram of carbobenzoxy-L-alanine-thiophenyl ester and 0.55 g. of diglycyl-L-leucine are heated in 5 cc. of glacial acetic acid for 90 minutes on the oil bath (bath temperature 130° C.). Thereby the tripeptide dissolves at once. By working up as usual, there is obtained the carbobenzoxy-L-alanyl-glycyl-glycyl-L-leucine in the form of an oil which crystallizes when allowed to stand. The yield is 0.693 gram (68% of the theory). From water, the compound crystallizes in the form of the monohydrate having a melting point of 122–123° C.

$[\alpha]_D^{23}$: 18.2° (c.=2.257 in abs. ethanol).

The same product is otbained by heating 1.28 grams of carbobenzoxy-L-alanyl-glycl-glycine-thiophenyl ester and 0.786 gram of L-leucine in 10 cc. of glacial acetic acid for 70 minutes to 130° C. and working up in the usual manner. Upon acidification of the bicarbonate solution, 0.85 gram of the carbobenzoxy-tetrapeptide (61% of the theory) melting at 123–124° C., crystallize out.

$[\alpha]_D^{22}$: −18.0° (c.=2.03 in absolute ethanol).

Example 24

4.45 grams of phthalyglycine-thiophenyl ester and 1.97 grams of L-leucine are heated in 20 cc. of glacial acetic acid for 1 hour on the oil bath (bath temperature 135°). The glacial acetic acid is then distilled off under reduced pressure; an oily residue which remains behind is shaken with about 30 cc. of an aqueous saturated sodium bicarbonate solution and acetic ester. The aqueous phase is acidified by dropwise adding concentrated hydrochloric acid. When triturating, 3.7 grams of phthalyl-glycyl-L-leucine (78% of the theory) crystallize out. After recrystallization from acetic ester/petroleum ether the compound melts at 157–159° C.

$[\alpha]_D^{26}$: −6.5° (c.=1.93 in ethanol).

Example 25

2 grams phthalyl-glycine-thiophenyl ester and 0.51 gram of glycine are heated in 30 cc. of glacial acetic acid on the oil bath (bath temperature 135° C.) for one hour and 50 minutes. By working up in the manner described in the foregoing example there are obtained 1.65 grams of phthalyl-glycyl-glycine (93.7% of the theory) having a melting point in the range of 228–229° C.

Example 26

4 grams of phthalyl-glycine-thiophenyl ester and 2.45 grams of L-tyrosine are heated in 60 cc. of glacial acetic acid on the oil bath (bath temperature 130° C.). The tyrosine dissolves very slowly. After 11 hours 60% of L-tyrosine have not yet reacted and are filtered off. By working up in the usual manner, there is recovered 1.40 grams (69% of the theory) of phthalyl-glycyl-L-tyrosine (calculated on the reacted tyrosine). The compound is very difficultly soluble in acetic ester. It is recrystallized from ethanol/water and melts, after sharp drying, at 230° C.

$[\alpha]_D^{23}$: +94° (c.=0.66 in ethanol).

Example 27

4.4 grams of phthalyl-glycine-thiophenyl ester and 1.34 grams of L-alanine in 15 cc. of glacial acetic acid are heated for 1¼ hours to 130° C. By working up, there are obtained 2.90 grams of phthalyl-glycyl-L-alanine (70% of the theory), having a melting point of 205–207° C.

$[\alpha]_D^{23}$: −25.3° (c.=1.4 in ethanol).

Example 28

4.45 grams of phthalyl-glycine-thiophenyl ester and 1.76 grams of L-valine are heated in 15 cc. of glacial acetic acid for 1 hour on the oil bath (bath temperature 135° C.). By working up in the usual manner, there are obtained 3.36 grams of phthalyl-glycyl-L-valine (74% of the theory) having a melting point of 203–204° C.

$[\alpha]_D^{27}$: −5.75° (c.=1.04 in ethanol).

Example 29

5 grams of phthalyl-glycine-thiophenyl ester and 2.78 grams of L-phenyl-alanine in 20 cc. of glacial acetic acid are heated for one hour on the oil bath (bath temperature 135° C.). By working up in usual manner, 2.24 grams of phthalyl-glycyl-L-phenyl-alanine (71.5% of the theory) having a melting point of 194–195° C., crystallize out.

$[\alpha]_D^{24}$: +56.8° (c.=1.23 in ethanol).

Example 30

5 grams of phthalyl-glycine-thiophenyl ester and 3.42 grams of L-tryptophane in 30 cc. of glacial acetic acid are heated for one hour on the oil bath (bath temperature 135° C.). By working-up as usual there are obtained 3.96 grams of phthalyl - glycyl - L - tryptophane (60.5% of the theory) melting at 210–211° C.

$[\alpha]_D^{26}$: +104.8° (c.=1.01 in ethanol).

Example 31

4 grams of phthalyl-glycine-thiophenyl ester and 1.55 g. of L-proline are heated in 15 cc. of glacial acetic acid for 1¼ hours on the oil bath (bath temperature 130° C.). By working up in usual manner 2.76 grams of phthalyl-glycyl-L-proline (68% of the theory), melting at 195–198° C., are obtained. After recrystallization from acetic ester/petroleum ether, the compound melts at 199–201° C.

$[\alpha]_D^{20}$: −57.5° (c.=0.91 in ethanol).

Example 32

1 gram of phthalyl-L-phenylalanine-thiophenyl ester is heated together with 0.195 g. of glycine in 5 cc. of glacial acetic acid for 1 hour on the oil bath (bath temperature 135° C.). By working up there is obtained, after repeated recrystallization from acetic ester/petroleum ether, 0.48 gram of phthalyl-L-phenyl-alanyl-glycine (53% of the theory).

$[\alpha]_D^{22}$: −140.1° (c.=1.05 in ethanol).

Example 33

5.3 grams of N - trifluoracetyl - L - phenylalanine - thiophenyl ester and 1.35 grams of L-alanine are heated in 15 cc. of glacial acetic acid for 2 hours on the oil bath (bath temperature 130° C.). By working up in the usual manner 2.89 grams are obtained of N-trifluoracetyl-L - phenylalanyl - L - alanine (58% of the theory). The compound is recrystallized from water and melts at 165–168° C.

$[\alpha]_D^{28}$: +12.2°   $[\alpha]_{546}$=+11.75°
(c.=1.15 in absolute tetrahydrofurane)

Example 34

4.3 grams of N - trifluoracetyl - L - phenylalanine-thiophenyl ester and 1.46 grams of L-valine are heated in 12 cc. of glacial acetic acid for 2 hours on the oil bath (bath temperature 130° C.). By working up in the usual manner there are obtained 2.65 grams of N - trifluoracetyl - L - phenylalanyl - L - valine (61% of the theory). The compound is recrystallized from water/ethanol (2:1) and melts at 175–177° C.

$[\alpha]_D^{26.5}$: +16.5°   $[\alpha]_{546}$=+17.4°
(C.=1.15 in absolute tetrahydrofurane) 1.35 grams of N-trifluoracetyl - L - phenylalanine - thiophenyl ester is recovered.

Example 35

5.3 grams of N - trifluoracetyl - L - phenylalanine-thiophenyl ester and 1.97 g. of L-leucine in 15 cc. of glacial acetic acid are heated on the oil bath (bath temperature 130° C.). By working up in the usual way there are obtained 3.53 grams of N-trifluoracetyl-L-phenyl-alanyl-L-leucine (63% of the theory). The compound is recrystallized from acetic ester and melts at 184–187° C.

$[\alpha]_D^{28}$: +0.95°   $[\alpha]_{546}$=+0.95°
(C.=3.15 in absolute tetrahydrofurane) 1.91 grams of N-trifluoracetyl-L-phenylalanine-thiophenyl ester are recovered.

Example 36

5.3 grams of N - trifluoracetyl - L - phenylalanine-thiophenyl ester and 2.48 grams of L-phenylalanine are heated in 15 cc. of glacial acetic acid for 2 hours on the oil bath (bath temperature 135° C.). By working up as usual there are obtained 4.15 grams of N - trifluor-acetyl-L-phenyl-alanyl-L-phenyl-alanine (68% of the theory) which after recrystallization from acetic ester melts at 218–219° C. with decomposition.

$[\alpha]_D^{26.5}$: +39.4°   $[\alpha]_{546}$=+46.2°
(C.=2.32 in absolute tetrahydrofurane) 1.08 grams of N-trifluoracetyl-L-phenylalanine-thiophenyl ester is recovered.

Example 37

5.3 grams of N - trifluoracetyl - L - phenylalanine-thiophenyl ester and 4.48 grams of L-methionine are heated in 20 cc. of glacial acetic acid for 3 hours on the oil bath (bath temperature 130° C.). By working up in the usual manner, there are obtained 3.39 grams of N-trifluoracetyl-L-phenylalanine-L-methionine (58% of the theory). After recrystallization from diisopropyl ether the compound melts at 177 and 178° C.

$[\alpha]_D^{26.5}$: +22.0°   $[\alpha]_{546}$=+23.9°
(C.=2.3 in absolute tetrahydrofurane. 0.92 gram of N-trifluoracetyl-L-phenylalanine-thiophenyl ester is recovered.

Example 38

1.21 gram of N - trifluoracetyl - glycine - cyanomethyl ester and 0.75 gram of L-leucine in 5 cc. of glacial acetic acid are heated for 90 minutes in the oil bath (bath temperature 130° C.). By working up in the usual manner there is obtained 0.19 g. of N - trifluoracetyl-glycyl-L-leucine (12% of the theory) having a melting point of 177–179° C.

Example 39

0.85 gram of carbobenzoxy-glycine-phenyl ester and 0.35 g. of DL-valine are heated in 5 cc. of glacial acetic acid for 40 minutes on the oil bath (bath temperature 130° C.). By working up in the usual manner, there is obtained 0.38 gram of carbobenzoxy-glycyl-DL-valine (41% of the theory) having a melting point of 125–126° C. The substance solidifies and melts, when further heated, at 143–144° C. It can be recrystallized from ethanol/water.

The preparation of carbobenzoxy-glycyl-L-valine, which crystallizes only slowly, proceeds in analogous manner.

*Example 40*

3.72 grams of carbobenzoxy-glycyl-L-alanine-thiophenyl ester ($[\alpha]_D^{23}$: −68° (c.=2.44 in ethanol), melting point 90–92° C.) and 1.11 grams of L-phenyl-alanyl-glycine ($[\alpha]_D^{28}$: −10.3° (c.=2.72 in glacial acetic acid) melting point 148° C.) are heated in 20 cc. of glacial acetic acid for two hours on the oil bath (bath temperature 120° C.). The glacial acetic acid is then distilled off in vacuo, and the residue is shaken with an aqueous sodium bicarbonate solution and acetic ester. During this, 0.51 gram of diketopiperazine, having a melting point of 255–256° C. (sublimation) and formed by intromolecular condensation from L-phenylalanyl-glycine remain undissolved and are removed by separation. The aqueous phase is then acidified by means of hydrochloric acid and then shaken several times with acetic ester. The acetic ester solution is dried with sodium sulfate and the acetic ester is evaporated under reduced pressure, 0.78 gram of carbobenzoxy-glycyl-L-analyl-L-phenylalanyl-glycine (32% of the theory) crystallizing out. By recrystallization from methanol there are obtained colorless needles that have a melting point of 175° C.

$[\alpha]_D^{24}$: −31.9° (c.=2.6 in glycol-monomethyl ether).

Hence, this compound shows the same melting point and the same optic rotation as the compound prepared by G. W. Kenner et al., (J. Chem. Soc., London, 1957, page 1406) which was obtained in an optically pure state by cumbersome countercurrent distribution only.

*Example 41*

3.01 grams of carbobenzoxy-glycine-thiophenyl ester and 1.82 grams of L-lysinemonohydrochloride are heated in 15 cc. of glacial acetic acid for 2 hours on the oil bath (bath temperature 130° C.). After evaporation of the glacial acetic acid in the vacuum, the residue is distributed between water and acetic ester.

The aqueous phase is buffered with sodium acetate, and the ε-carbobenzoxy-glycyl-L-lysine is precipitated as copper complex by mixing it up by stirring with copper carbonate. The precipitate is filtered off and decomposed with hydrogen-sulfide in boiling water. After separation by filtration of the copper sulfide, the whole is subjected to evaporation under reduced pressure; thereby the compound crystallizes. After addition of ethanol, the product is drawn off and dried. There is obtained 0.24 gram of ε-carbobenzoxy-glycyl-L-lysine (7.2% of the theory) having a melting point of 234–235° C. After recrystallization from water, the compound melts at 240–242° C.

$[\alpha]_D^{23}$: +8.3°.

*Example 42*

1.02 grams of phthalyl-glycine-p-nitrothiophenyl ester and 0.27 gram of L-alanine are heated in 5 cc. of glacial acetic acid for 2 hours on the oil bath (bath temperature 125° C.). By working up in the usual manner there is obtained 0.454 gram of phthalyl-glycyl-L-alanine (46% of the theory). After recrystallization from acetic ester/petroleum ether, there is obtained 0.426 g. of product (43% of the theory) having a melting point of 205–206° C.

$[\alpha]_D^{20}$: −25.9° (c.=1.1 in ethanol).

*Example 43*

3.0 grams of carbobenzoxy - L-alanyl-glycyl-glycine-thiophenyl ester and 1.42 grams of L-alanyl-glycyl-glycine in 20 cc. of glacial acetic acid are heated for 1 hour to 130° C. After having distilled off the acetic acid and the thiophenol under reduced pressure, the residue is distributed between water and acetic ester (while warming slightly). From the acetic ester solution there can be recovered 0.35 gram of unreacted carbobenzoxy-L-alanyl-glycyl-glycine-thiophenyl ester.

Evaporation of the aqueous phase leaves behind a residue which crystallizes upon addition of hot acetic ester. The crystals are filtered off and taken up in water. The slightly brown solution formed thereby is then treated with a small quantity of active charcoal, filtered and then treated with an ion exchanger (H+—form) until the ninhydrin reaction becomes imperceptible. The solution which is then completely colorless is filtered and the ion-exchanger is washed well with water. From the solution so treated there crystallize out, upon concentration, 1.77 grams of carbobenzoxy-L-alanyl-glycyl-glycyl-L-alanyl-glycyl-glycine having a melting point of 157–160° C. (after sintering at 148° C.). Further 0.79 gram of the hexapeptide melting at 148–152° C. can be recovered from the mother liquor. The total yield is thus 2.56 grams (67% of the theory). After recrystallization from water, the compound melts at 161–163° C. (after sintering at 117–118° C.).

$[\alpha]_D^{22}$: −4.6° (c.=2.38 in dimethylformamide).

The compound crystallizes with one mol of crystal water.

We claim:

1. A process for the preparation of N-acyl-peptides of the formula

R—X—CO—(X—CO)$_n$OH wherein $n$ is an integer from 1 to 5, R represents a member selected from the group consisting of trifluoracetyl, carbobenzoxy and phthalyl, X stands for a member selected from the group consisting of

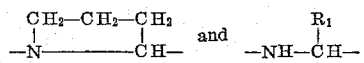

wherein $R_1$ stands for a member selected from the group consisting of hydrogen, methyl, isopropyl, isobutyl, α - hydroxyethyl, O - benzoxymethyl, delta-amino-butyl, γ-guanidyl-propyl, γ-nitroguanidyl-propyl, S-methyl-mercaptoethyl, S - benzyl - mercaptomethyl, carbomethoxymethyl, indolyl-methyl, benzyl and 4-hydroxybenzyl, which comprises reacting an ester of the formula R—X—CO—(X—CO)$_m$OR$_2$ wherein R and X have the meanings given above, R$_2$ represents a member selected from the group consisting of phenyl, thiophenyl, p-nitrophenyl, p-nitrothiophenyl and cyanomethyl, and $m$ is an integer from 0 to 2, with an acid of the formula H—X—CO—(X—CO)$_m$OH wherein X and $m$ have the meanings given above, in a carboxylic acid selected from the group consisting of acetic acid, propionic acid and methoxy acetic acid.

2. The process as claimed in claim 1, wherein acetic acid is used as the carboxylic acid.

3. The process as claimed in claim 1, wherein the activating residue of the reactive ester is the thiophenyl group.

4. The process as claimed in claim 1, wherein the activating residue of the reactive ester is the phenyl group.

5. The process as claimed in claim 1, wherein the activating residue of the reactive ester is the p-nitrophenyl group.

6. The process as claimed in claim 1, wherein the activating residue of the reactive ester is the p-nitrothiophenyl group.

7. The process as claimed in claim 1, wherein the reaction is carried out at a temperature between 50° C. and 150° C.

References Cited by the Examiner

Bodanszky, Chemistry and Industry (1955) page 1517.
Bodanszky, Nature, vol. 175, page 685 (1 page), 1955.
Richter, "The Textbook of Organic Chemistry," page 196, 3rd. ed., John Wiley & Sons, New York (1952).
Rydon et al., Chemical Society Journal (1956), pages 3642–3650.

LEWIS GOTTS, *Primary Examiner.*

CHARLES B. PARKER, LEON ZITVER, *Examiners.*

J. ZIEGLER, P. SABATINE, D. P. CLARKE,
*Assistant Examiners.*